United States Patent [19]
Tada

[11] 4,349,875
[45] Sep. 14, 1982

[54] BUFFER STORAGE CONTROL APPARATUS
[75] Inventor: Masahiro Tada, Tokyo, Japan
[73] Assignee: Nippon Electric Co., Ltd., Tokyo, Japan
[21] Appl. No.: 152,968
[22] Filed: May 23, 1980
[30] Foreign Application Priority Data
May 25, 1979 [JP] Japan .................................. 54-65445
[51] Int. Cl.³ .......................... G06F 7/34; G11C 7/00; G06F 7/00
[52] U.S. Cl. .................................................. 364/200
[58] Field of Search ... 364/200 MS File, 900 MS File
[56] References Cited
U.S. PATENT DOCUMENTS
3,699,533 10/1972 Hunter ................................ 364/200
4,008,460 2/1977 Bryant et al. ....................... 364/200

Primary Examiner—Gareth D. Shaw
Assistant Examiner—John Gladstone Mills
Attorney, Agent, or Firm—Sughrue, Mion, Zinn, Macpeak & Seas

[57] ABSTRACT

A buffer storage control apparatus selectively employs the conventional "least-recently-used" (LRU) algorithm or the "all-used" (AU) algorithm to determine which block of data in the buffer storage unit is to be replaced by new data. The AU algorithm relies on the fact that under certain conditions, such as the straight transfer of a block of data from a main memory to an output device under the control of an I/O supervisor, the block of data so transferred will no longer be needed. The control apparatus therefore detects such a data transfer and selectively allocates buffer storage in accordance with the AU or LRU algorithms.

3 Claims, 9 Drawing Figures

BUFFER STORAGE CONTROL APPARATUS

BACKGROUND OF THE INVENTION

This invention relates to a buffer storage control apparatus for use in an electronic data processing (EDP) system.

Buffer storage techniques have been used to reduce the effective access time for main memory unit (MMU) or input/output (I/O) storage units. In a practical EDP system designed to achieve a shorter access time, a high-speed random access memory (RAM) unit is provided at a central processing unit (CPU) as a buffer storage unit to store frequently used data. The buffer storage unit serves to greatly reduce the access time as compared to the system only using the MMU. One example of such a configuration is described in a paper by Harry Katzan, Jr., entitled "Storage Hieraarchy Systems," proceedings of the Spring Joint Computer Conference, 1971, pp. 325-336.

However, since such a buffer storage unit is costly, its storage capacity is not large enough to have a complete copy of all the contents stored in the MMU. Therefore, to store new data in the buffer storage unit, an old block of data stored in said storage unit must be replaced. Known alogorithms for data block (referred to simply as "block" hereunder) replacement include the random replacement (RR) alogrithm for replacing blocks at random, the first-in-first-out (FIFO) algorithm for replacing the block stored first, and the least-recently used (LRU) algorithm for replacing the oldest block at the time of the final reference. For details of these algorithms, reference can be made to a paper by J. Gecsei, D. R. Slutz and I. L. Traiger, entitled "Evaluation Techniques For Storage Hierarchies," IBM Systems Journal, No. 2, 1970, pp. 78-117.

Under particular conditions, cases exist where a block once read out of the buffer is seldom used afterwards. For example, when a designated block in the MMU is transferred from its input area to its user area by the use of an I/O supervisor program, all the data stored in the corresponding block in a buffer storage unit is no longer needed. For this reason, more efficient use of the buffer storage unit can be achieved by replacing the corresponding block rather than by replacing the first-used block, for example. Also, if data words are sequentially read out of a disk storage unit in the order of the disk sector or cylinder and, as a result, all the data words in the corresponding block in the buffer storage unit are read out therefrom, it is more efficient to replace such a block in place of the first-used block, for example. In either case, none of the conventional algorithms are effective. More specifically, by the use of the RR algorithm, replacement is performed randomly; by the FIFO algorithm, the first stored block is replaced regardless of whether not it is read out, and finally, by the LRU algorithm, the least-recently used block is replaced. In each case, a necessary block rather than an unnecessary block may be replaced using the conventional techniques.

SUMMARY OF THE INVENTION

An object of the present invention is to provide a buffer storage control apparatus which is well-suited for effective use with a buffer storage unit using a novel block replacement algorithm.

According to the present invention, a buffer storage control apparatus is disposed between a CPU and an MMU or between an MMU and at least one I/O storage unit. The apparatus includes a buffer storage unit for storing a portion of the contents of the MMU when disposed between the CPU and the MMU or a portion of the contents of said at least one I/O storage unit when disposed between the MMU and said at least one I/O storage unit; and a control unit for controlling said buffer storage units, said control unit comprising: an address register for storing a given address related to a buffer storage unit address; a directory memory for storing a portion of the given address; a plurality of address comparators, each comparing a portion of the given address in the address register with the portion of the given addresses stored in said directory memory; means responsive to the given address in the address register for performing a read operation for reading a data block out of the buffer storage unit with the occurrence of a match in one of said comparators; a replacement block-detecting circuit for detecting the read operation of specific data in said data block stored in the buffer storage unit; a selector for selecting a selected address for subsequent replacement of a data block, the selected address indicating the data block in which the read operation for said specific data was detected by the detecting circuit; and means for writing, in the absence of a match in any one of said comparators, into the buffer storage unit at an address location that is designated by (i) a portion of the given address and (ii) the selected address of the data block previously selected by said selector, a data block stored in the corresponding address of the MMU or said at lease one I/O storage unit which pairs with the buffer storage unit.

BRIEF DESCRIPTION OF THE DRAWINGS

This invention is described hereunder in greater detail with reference to the accompanying drawings, in which.

In the drawings, each signal path indicated by a thin line is assumed to carry parallel-bit signals with the exception of FIGS. 6, 7 and 8. Also, like reference numerals represent like structural elements.

DETAILED DESCRIPTION OF THE INVENTION

Figure 1:
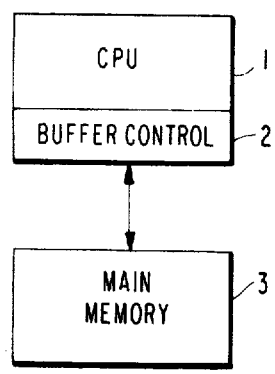
FIGS. 1 and 2 are diagrams of EDP systems.
Figure 2:
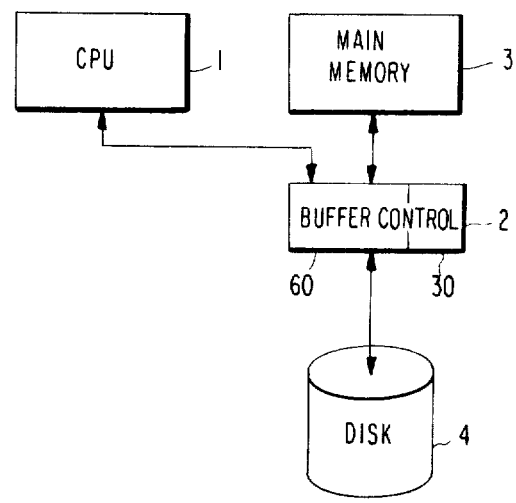

The present invention may be applied to each of the EDP systems shown in FIGS. 1 and 2. The EDP system of FIG. 1 includes a CPU1, the buffer control apparatus 2 of the present invention, the MMU3, and a disk storage unit 4. The disk unit 4 has a large memory capacity and a slow access time compared with the associated buffer storage unit used in the buffer control apparatus 2, which will be described in detail later.

One embodiment of the present invention employs the "all-used" (AU) algorithm based on the fact that the data block most recently used is replaced first when all of the data words in the block have been used.

Figure 3:
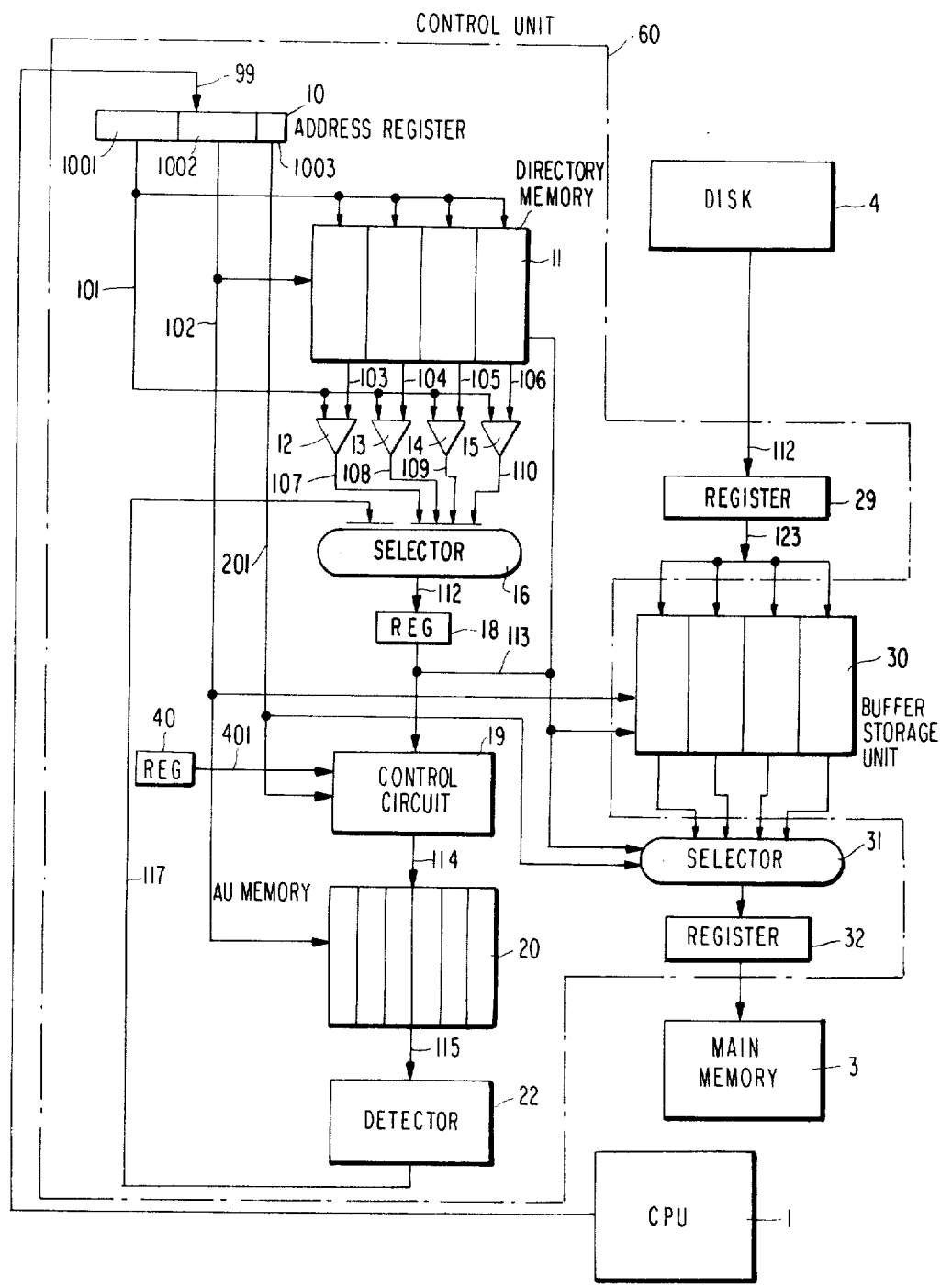
FIG. 3 shows one embodiment of the present invention.

Referring further to FIG. 3, one embodiment of the present invention includes a control unit 60 and a buffer storage unit 30 consisting of 256-block-by-4-block RAM. The control unit 60 comprises an address register 10 for storing a given address, a directory memory 11 having the same structure as the memory 30 for storing a portion of the address given, comparators 12, 13, 14, and 15 each of which compares the address from the register 10 with the corresponding contents one of the four blocks of the memory 11, a selector 16, a four-bit register 18 for storing the output of the selector 16, an AU control circuit 19, and AU memory 20 for storing AU control bits, a replacement-block detecting circuit 22, a register 29 for storing data from the disk storage unit 4, a selector 31 for selecting one of the four blocks of the buffer storage unit 30, and register 32 and 40.

The disk address including the number assigned to each sector of the disk storage unit 4 is delivered to the register 10 from the CPU1. In the case of the system of FIG. 1 using the CPU cache 2, the main memory address from the MMU3 is similarly stored in the register 10.

As shown in FIG. 3, the address register 10 consists of a first field 1001, a second field 1002, and a third field 1003. The first field ranks highest in the bit position and is supplied through a line 101 to the directory memory 11 as a data input and to the comparators 12, 13, 14 and 15, so that one of the four blocks in the row direction of the memory 11 may be selected by the comparators. The second field is delivered through a line 102 to the directory memory 11 as an address input, the AU memory 20, and the buffer storage unit 30 in order to designate the four blocks of the memory 11. The third field is sent to the selector 31 and the AU control circuit 19 in order to designate individual data words in the block designated by the first and second fields.

The four blocks in the memory 11 addressed by the second field are fed to the comparators 12, 13, 14, and 15 through paths 102, 104, 105 and 106, respectively. Each of the four comparators compares the address in the first field of the register 10 with the contents (address) stored in each of the four blocks of the memory 11. Each comparator produces logical "1" or "0" depending on whether coincidence is made or not, coincidence showing that the copy of the designated block exists in the buffer storage unit 30. The result of each comparison is loaded into the four-bit register 18 through paths 107 to 110 and selector 16. In response to the coincidence for any one of the four blocks, the corresponding block in the unit 30 is selected by the selector 31 and loaded in the register 32. At the same time, the third field in the register 10 is also supplied to the selector through a path 201 to select data in the block.

The third field in the register 10 and a mode signal from the mode register 40 are supplied to the AU control circuit 19 through the path 201 and a path 401, respectively. The mode signal provides for AU operation and is set in register 40 when a data transfer instruction is given from the CPU 1 to the CPU cache 2 to transfer a block of the MMU3 data to its user's area in the case of the FIG. 1 configuration, or when a block is read out sequentially from the disk storage unit 4 in the order of the sector of the disk 4 in response to the data transfer instruction from the CPU1, in the FIG. 2 embodiment. The mode signal may alternatively be given manually by an operator from a console.

Responsive to the read-out operation of the last data word in the selected block, the AU control circuit 19 controls the rewriting operation for the AU memory 20 through a path 114.

Figure 4:
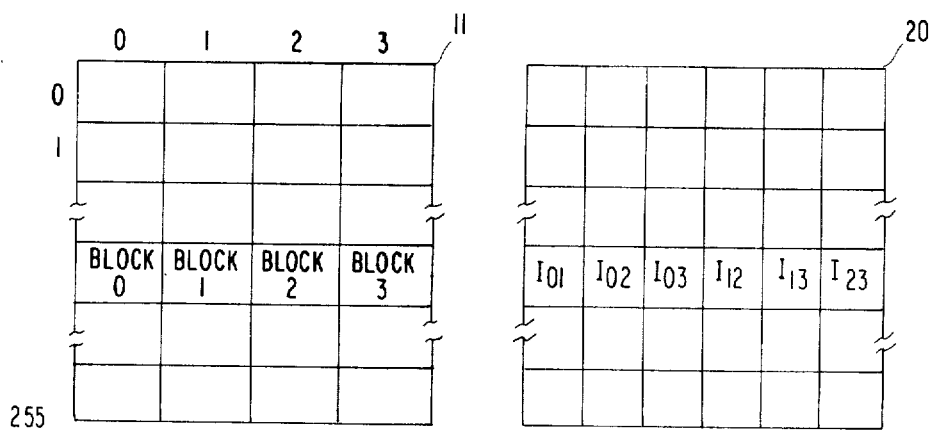
FIGS. 4 and 5 are diagrams illustrating the algorithm for use in conjunction with the present invention.

If the above-mentioned coincidence is not found for any one of the four blocks, the detecting circuit 22 determines a block to be replaced by using an AU control bit group of six bits as shown in FIG. 4 delivered from the memory 20 through a path 115.

Referring to FIG. 4, each AU control bit group (for instance, $I_{01}, I_{02}, \ldots, I_{13}, I_{23}$) stored in the memory 20 determines which one of the four blocks in the memory 11 is to be replaced first. For example, the AU control bit $I_{02}$ of logical "1" indicates that block 0 should be replaced after block 2; and the bit $I_{02}$ of logical "0" indicates that block 0 should be replaced before block 2. Similar operations are carried out by the other five AU control bits.

Figure 5:
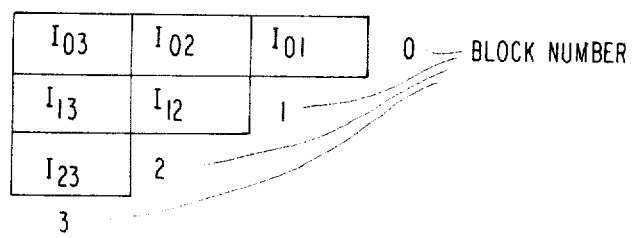

The six AU control bits are rewritten to perform the above-discussed replacement of one of the four blocks as will be discussed in detail with reference to FIG. 5. As soon as the read-out operation for the selected one of the four blocks has been completed, the AU control bits in the row (horizontal) direction and those in the column (vertical) direction in the selected block are rewritten. More specifically, according to the conventional LRU algorithm, the control bits in the row direction assume logical "1" whereas those in the column direction assume logical "0". On the other hand, with the present apparatus, the block for which the read-out operation has been completed is considered unnecessary and selected for replacement when the control bits in the row direction are logical "0" together with those of logical "0" in the column direction. For example, according to the LRU algorithm, if a block 1 has been read out, the bits $I_{12}$ and $I_{13}$ assume logical "1" with the bit $I_{01}$, of logical "0". In contrast, according to the present invention in the same case, the bits $I_{12}$ and $I_{13}$ assume logical "0" with the bit $I_{01}$ of logical "1".

To store new data in the storage unit 30 in accordance with the present invention, one of the four blocks is replaced using the following logical formulae:

Block $0 = \overline{I_{01}} \cap \overline{I_{02}} \cap \overline{I_{03}}$

Block $1 = I_{01} \cap \overline{I_{12}} \cap \overline{I_{13}}$

Block $2 = I_{02} \cap I_{12} \cap \overline{I_{23}}$

Block $3 = I_{03} \cap I_{13} \cap I_{23}$ where the symbol $\cap$ represents a logical product.

The detecting circuit 22 generates a four-bit signal wherein one bit associated with the block to be replaced assumes logical "1". The four-bit signal is sent from the circuit 22 through path 117, selector 16, and path 112 to register 18. The first field in the register 10 is placed into the block of the directory memory 11 at a location designated by the second field in the register 10 and the address given through a path 113 from the register 18. The third field in the register 10 is supplied to the AU control circuit 19 for rewriting the AU memory 20 as discussed above. The data read out from the disk storage unit 4 is loaded in the register 29 through the path 112, and stored through a path 123 into the block at the buffer storage unit 30 designated by the second field in the register 10 and the address of the register 18.

With reference to FIG. 3, the address register 10, registers 18 and 40, and the data registers 29, 32 may be of the type described in "TTL Data Book for Design Engineers", published by Texas Instruments Incorporated, 1973, page 362. Each of the comparators 12, 13, 14 and 15 may be of the type described on page 203, and each of the selectors 16 and 31 can be of the type described on page 318 or 303 of the "TTL Data Book for Design Engineers". The directory memory 11 and data memory 30 can be of the type shown in FIGS. 5-4 on pages 5-9 of "Bipolar Memory Data Book", published by Fairchild Camera Instrument Corporation, 1979.

Figure 6:
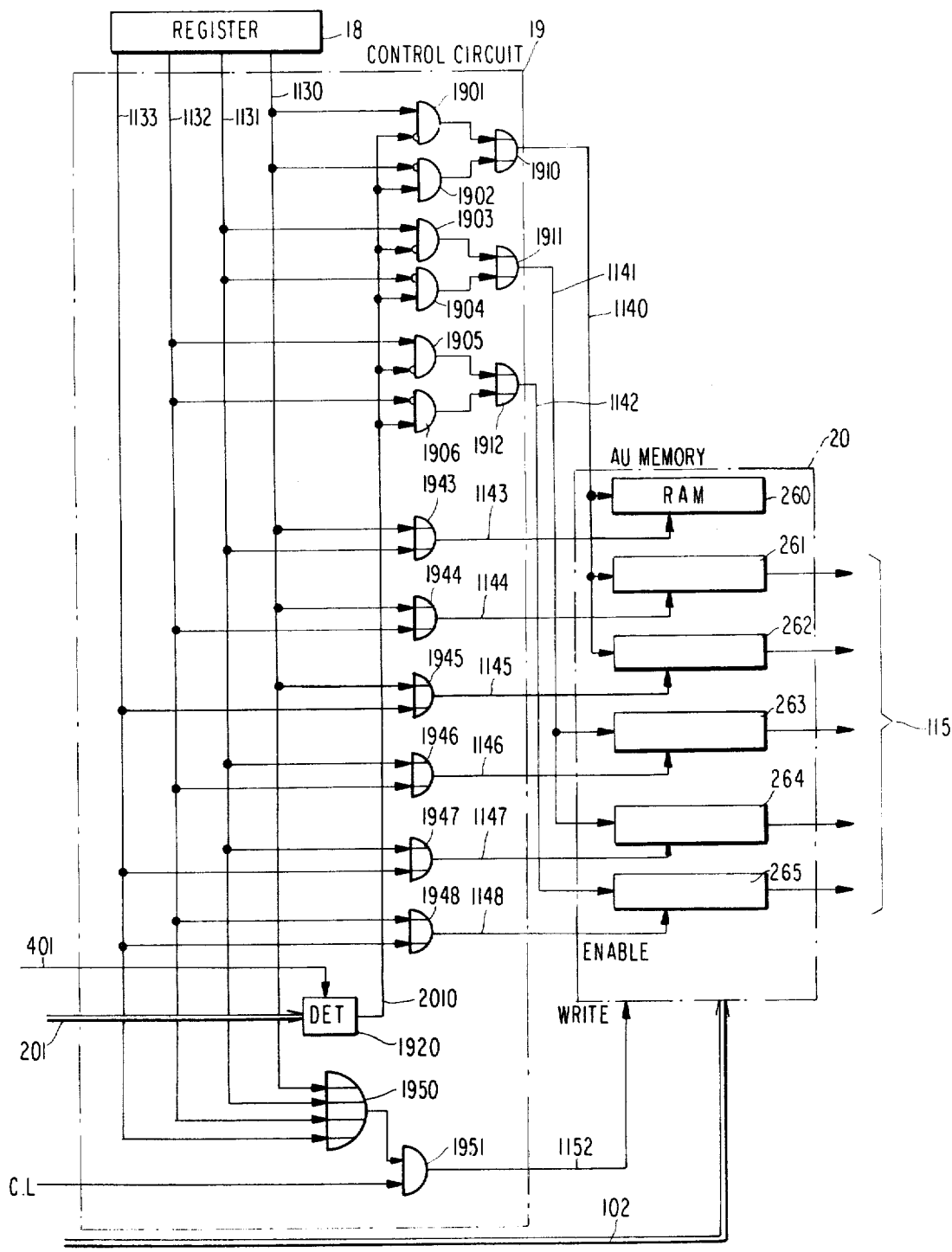
FIG. 6 is a diagram of a portion of one embodiment of the present invention.

FIG. 6 shows in detail the AU control circuit 19 and the AU memory 20. The AU memory 20 comprises six memory cells 260, 261, 262, 263, 264, and 265, each cell being composed of an RAM element to retain the AU control bits $I_{01}$, $I_{02}$, $I_{03}$, $I_{12}$, $I_{13}$ and $I_{23}$. Each memory cell is controlled by the second field address delivered on path 102 from register 10, and a write pulse delivered on path 1152 and write enabling signals delivered on paths 1143 to 1148 from control circuit 19. The write pulse on path 1152 is obtained by a logical sum of signals 1130 to 1133 delivered from register 18 into an OR gate 1950. The logical sum is then supplied to an AND gate 1951 to provide a logical product with clock pulse CL. AND gates 1901 to 1906 and OR gates 1910 to 1912 generate AU control bits.

Responsive to the mode signal delivered through path 401, a detecting circuit 1920 produces logical "1" on path 2010 immediately after the read operation for all of the data in a block has been completed by inspecting the third field in the register 10 delivered on the path 201. Thus, the read operation for the last data word in the block is detected by the circuit 1920.

In the presence of the mode signal, the circuit 1920 delivers logical "0" on the path 2010 and the signals on lines 1140-1142 pass unchanged. If the output of the circuit 1920 is logical "1", the signals on lines 1140-1142 are inverted by virtue of the exclusive OR arrangement of gates 1901-1906 and 1910-1912. The AU control bits on lines 1140-1142 for selecting the particular block for replacement are written in the memory cells 260 to 265 of the memory 20.

Figure 7:
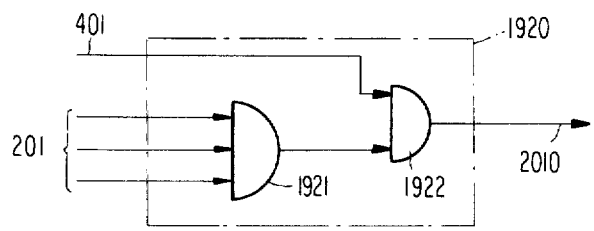
FIG. 7 shows in detail a portion of the circuit of FIG. 6.

Referring to FIG. 7, the circuit 1920 comprises AND gates 1921 and 1922. The third field in the address register 10 shown in FIG. 3 is delivered to AND gate 1921 along line 201. The AND gate 1921 produces logical "1" when all inputs are logical "1", that is, when the third field in the register 10 designates the address of the last data word in the block. The logical product of the AND circuit 1921 and the mode selection signal from the path 401 are supplied to the path 2010. Register 40 provides logical "1" along path 401 when it is desired to operate the system based on the AU algorithm, while register 40 provides logical "0" along the path 401 when operation is based on the conventional LRU algorithm.

Figure 8:
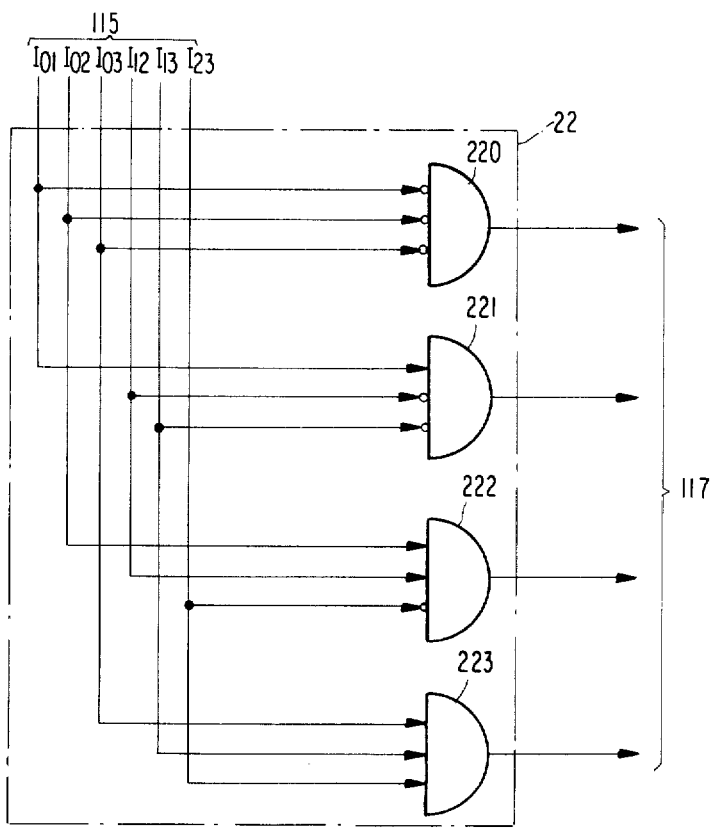
FIG. 8 is a diagram showing in detail another portion of the circuit of FIG. 6.

FIG. 8 shows in greater detail the block detecting circuit 22 and will be discussed with reference to FIG. 5. The circuit 22 comprises gates 220 and 223. The AU control bits that have been read out from the AU memory 20 are supplied to the gates 220 and 223 through the path 115. Logical "1" is produced at one of the gates 220 to 223 to designate a block to be replaced, and then sent to the selector 16 through the path 117.

Figure 9:
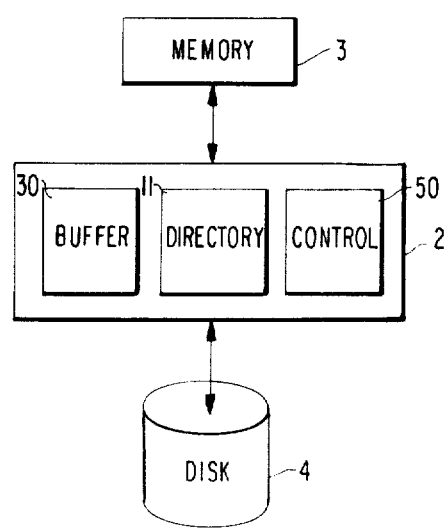
FIG. 9 illustrates still another EDP system.

This invention can be further applied to the EDP system provided with a program-controlled disk cache of the type shown in FIG. 9. The present apparatus 2 comprises the buffer storage unit 30, the directory memory 11, and a control memory 50. With this system, the updating of the directory memory 11, the selection of the block to be replaced, and the read-out operation for and the updating of the data memory 30 are executed under control of microinstructions sotred in the control memory 50.

For simplicity of illustration, conventional circuits, such as power sources, clock circuits, and the like, have been omitted. Further, it should be noted that various changes and modifications can be made to the shown embodiment without departing from the spirit and scope of the invention.

What is claimed is:

1. A buffer storage control apparatus disposed between a central processing unit (CTU) and a main memory unit (MMU) or between an MMU and at least one input/output (I/O) storage unit, said control apparatus including a buffer storage unit for storing a portion of the contents of the MMU when disposed between the CPU and the MMU or a portion of the contents of said at least one I/O storage unit when disposed between MMU and said at least one I/O storage unit, and a control unit for controlling said buffer storage unit, said control unit comprising:

an address register for storing a given address having first, second and third portions and related to the MMU or said at least one I/O storage unit;

a directory memory for storing the second portion of the given address;

a plurality of address comparators, each comparing the first portion of the given address and the address register with the portions of the given address stored in said directory memory;

means responsive to the first and second portions of the given address in the address register for performing a read operation for reading a data block out of the buffer storage unit with the occurrence of a match in one of said comparators;

a replacement-block detecting circuit for detecting the read operation for specific data in said data block stored in the buffer storage unit;

a selector for selecting a selected address for a subsequent replacement of a data block, the selected address indicating the data block in which the read operation for said specific data was detected by the detecting circuit;

means for writing, in the absence of a match in any one of said comparators, into the buffer storage unit at an address location that is designated by (i) said first and second portions of the given address and (ii) the selected address of the data block previously selected by said selector, a data block stored in the corresponding address of the MMU or said at least one I/O storage unit which pairs with the buffer storage unit;

means for storing (18) the selected address;

a selector memory (20);

a selector control circuit (19) receiving the selected address, said selector control circuit comprising a plurality of exclusive OR logic means each receiving a bit from the means for storing (18); and a detecting circuit (1920) receiving the third portion of the given address for detecting the last data word in the data block read out of the buffer storage and for providing an inverting control signal (2010) to the exclusive OR logic means, whereby the selector control circuit (19) delivers (i) the selected address to the selector memory (20) when the inverting control signal is at a first logic state, and (ii) the selected address with the bits thereof inverted when the inverting control signal is at a second logic state opposite said first logic state.

2. The control apparatus of claim 1, further comprising means for storing (40) a content that designates the operation of the system based on an all-used algorithm that allows the data block most recently used to be replaced first when all of the data words in the block have been used, wherein said detecting circuit (1920) detects the last word in the data block read out of said buffer storage in response to the content of said means for storing (40).

3. The apparatus of claims 1 or 2, wherein said detecting circuit (1920) further comprises means (1922) for selectively preventing the inversion of the bits of the selected address.

* * * * *

UNITED STATES PATENT AND TRADEMARK OFFICE
CERTIFICATE OF CORRECTION

PATENT NO. : 4,349,875
DATED : September 14, 1982
INVENTOR(S) : Masahiro TADA

It is certified that error appears in the above—identified patent and that said Letters Patent is hereby corrected as shown below:

Column 1, line 26 - change "alogorithms" to --algorithms-- line 28 - change "alogrithm" to --algorithm--

Column 4, line 37 - change " "0" " to --"1"--

Column 5, line 65 - change "220 and 223" to --220 to 223--

Column 6, line 9 - change "sotred" to --stored-- line 14 - change "and modifications" to --or substitutions--

Signed and Sealed this

Eighth Day of March 1983

[SEAL]

Attest:

GERALD J. MOSSINGHOFF

Attesting Officer     Commissioner of Patents and Trademarks